United States Patent
Lee et al.

(10) Patent No.: US 11,433,354 B2
(45) Date of Patent: Sep. 6, 2022

(54) WATER PURIFIER

(71) Applicant: COWAY Co., Ltd., Gongju-si (KR)

(72) Inventors: Jong-Hwan Lee, Seoul (KR); Hee-Do Jung, Seoul (KR); Hyun-Goo Kim, Seoul (KR); Yoo-Won Oh, Seoul (KR); Chan-Jung Park, Seoul (KR); Woong Jung, Seoul (KR)

(73) Assignee: COWAY Co., Ltd., Gongju-si (KR)

( * ) Notice: Subject to any disclaimer, the term of this patent is extended or adjusted under 35 U.S.C. 154(b) by 0 days.

(21) Appl. No.: 17/260,810

(22) PCT Filed: Jul. 8, 2019

(86) PCT No.: PCT/KR2019/008369
§ 371 (c)(1),
(2) Date: Jan. 15, 2021

(87) PCT Pub. No.: WO2020/017805
PCT Pub. Date: Jan. 23, 2020

(65) Prior Publication Data
US 2021/0316251 A1      Oct. 14, 2021

(30) Foreign Application Priority Data
Jul. 17, 2018  (KR) .......................... 10-2018-0083038

(51) Int. Cl.
*B01D 61/10* (2006.01)
*B01D 61/02* (2006.01)
(Continued)

(52) U.S. Cl.
CPC .......... *B01D 61/10* (2013.01); *B01D 61/025* (2013.01); *B01D 61/08* (2013.01); *C02F 1/441* (2013.01);
(Continued)

(58) Field of Classification Search
CPC .......... B01D 2313/025; B01D 2313/06; B01D 2313/243; B01D 2313/90; B01D 35/14;
(Continued)

(56) References Cited

U.S. PATENT DOCUMENTS

| | | |
|---|---|---|
| 5,824,215 A | 10/1998 | Suh |
| 2008/0106014 A1* | 5/2008 | Gigl .................. F16F 1/3605 267/140 |
| 2019/0135655 A1* | 5/2019 | Steudten ............... B01D 35/26 |

FOREIGN PATENT DOCUMENTS

| | | |
|---|---|---|
| CN | 201648155 U | 11/2010 |
| CN | 204312410 U | 5/2015 |

(Continued)

OTHER PUBLICATIONS

International Search Report dated Oct. 14, 2019 in PCT/KR2019/008369 filed on Jul. 8, 2019, 2 pages.
(Continued)

*Primary Examiner* — Terry K Cecil
(74) *Attorney, Agent, or Firm* — Oblon, McClelland, Maier & Neustadt, L.L.P.

(57) ABSTRACT

A water purifier includes a water purifier body, a filter bracket provided inside the water purifier body, a pump unit provided inside the water purifier body and including a pump connected to a main water purifying filter installed in the filter bracket, and a vibration transmission-preventing unit which, while the main water purifying filter is installed in the filter bracket, ensures the transmission, to the filter bracket and the water purifier body, of vibrations due to the pressure difference between the pump and the main water purifying filter when water is supplied to the main water purifying filter by means of the pump is reduced by a filter vibration-damping member.

10 Claims, 6 Drawing Sheets

(51) Int. Cl.
    *B01D 61/08* (2006.01)
    *C02F 1/44* (2006.01)
    *B67D 1/08* (2006.01)

(52) U.S. Cl.
    CPC .... *B01D 2313/06* (2013.01); *B01D 2313/243* (2013.01); *B01D 2313/90* (2013.01); *B67D 1/08* (2013.01); *C02F 2201/004* (2013.01)

(58) Field of Classification Search
    CPC ...... B01D 35/30; B01D 61/025; B01D 61/08; B01D 61/10; B67D 1/08; B67D 1/10; B67D 2210/0001; C02F 1/441; C02F 2201/004
    See application file for complete search history.

(56) References Cited

FOREIGN PATENT DOCUMENTS

| | | |
|---|---|---|
| CN | 205613138 U | 10/2016 |
| CN | 206463791 U | 9/2017 |
| CN | 207192949 U | 4/2018 |
| JP | 2719037 B2 | 2/1998 |
| KR | 20-107034 Y1 | 9/1997 |
| KR | 20-122681 Y1 | 5/1998 |
| KR | 10-168274 B1 | 1/1999 |
| KR | 2001-0047477 A | 6/2001 |
| KR | 10-2010-0104405 A | 9/2010 |
| KR | 101409480 B1 * | 6/2014 |

OTHER PUBLICATIONS

Office Action dated Jun. 30, 2022, in corresponding Chinese Patent Application No. 201980047718.7 with English Translation, 17 pages.

* cited by examiner

WATER PURIFIER

TECHNICAL FIELD

The present invention relates to a water purifier.

BACKGROUND ART

A water purifier is a device for filtering water to supply to users.

A water purifier is provided with a water purification filter through a filter bracket, or the like, to filter water introduced thereinto. In the case in which a reverse osmosis filter, or the like, among water purification filters, is used, water can be filtered through a reverse osmosis filter, or the like, only when the water is supplied to the reverse osmosis filter, or the like, at a predetermined filtration pressure.

To this end, the water purifier is provided with a pump to be connected to the reverse osmosis filter, or the like, and supplies water to the reverse osmosis filter, or the like, at a predetermined filtration pressure by the pump.

Conventionally, in a water purifier having such a configuration, vibrations caused by a pressure difference between the pump and the reverse osmosis filter, or the like, were delivered to a filter bracket, or the like, and a water purifier body through the reverse osmotic filter, or the like, when water is supplied to the reverse osmosis filter by the pump, even when a noise and vibrations of the pump are attenuated by a vibration-proof rubber member, or the like.

DISCLOSURE

Technical Problem

The present invention is based upon recognition of at least one of the requirements or problems generated in the related art as mentioned above.

An aspect of an object of the present invention is to reduce the transmission of vibrations to a filter bracket and a water purifier body due to a pressure difference between a pump and a main water purifying filter when water is supplied to the main water purifying filter by the pump.

Technical Solution

A water purifier related to an embodiment for realizing at least one of the above problems may include the following features.

The water purifier includes a water purifier body; a filter bracket provided inside the water purifier body; a pump unit provided inside the water purifier body and including a pump connected to a main water purifying filter installed in the filter bracket; and a vibration transmission-preventing unit which, when the main water purifying filter is installed in the filter bracket, ensures the transmission, to the filter bracket and the water purifier body, of vibrations due to the pressure difference between the pump and the main water purifying filter when water is supplied to the main water purifying filter by means of the pump, is reduced by a filter vibration-damping member.

In this case, the pump unit may be configured to attenuate vibrations and noise of the pump by a pump vibration-damping member.

Further, the vibration transmission-preventing unit may include the filter vibration-damping member provided in the filter bracket, a clip member connected to the filter bracket through the filter vibration-damping member and in which a portion of a circumference of the main water purifying filter is inserted and installed, and an elastic band member connected to the clip member to elastically surround the remaining circumference of the main water purifying filter.

The filter vibration-damping member and the elastic band member may be formed of rubber.

The clip member may be provided with an arc-shaped filter installation portion in which a portion of the circumference of the main water purifying filter is inserted and installed.

In addition, the elastic band member may have an arc shape correspondingly to the filter installation portion.

The clip member may be formed with a band connection groove, wherein a band connection protrusion inserted into and connected to the band connection groove is formed in the elastic band member.

Further, the clip member may be formed with a supplemental connection protrusion, wherein a supplemental connection hole into which the supplemental connection protrusion is inserted and connected is formed in the elastic band member.

The filter bracket may be formed with a vibration-damping member-supporting portion having an insertion support hole in which one end of the filter vibration-damping member is inserted, wherein the clip member is formed with a connection insertion hole into which the other end of the filter vibration-damping member is inserted.

The vibration-damping member-supporting portion may further be formed with a through-connection protrusion to be provided in the insertion support hole, wherein the filter vibration-damping member is formed with a through-hole through which the through-connection protrusion passes.

In addition, the through-connection protrusion may be formed with a coupling hole, wherein a coupling member is coupled to the coupling hole such that the clip member is connected to the filter bracket.

The pump unit may further include a first pump vibration-damping portion comprising a pump supporting board configured to support the pump and a first pump vibration-damping member provided on the pump supporting board.

The pump unit may further include a second pump vibration-damping portion comprising a support member configured to support the first pump vibration-damping portion, a second pump vibration-damping member provided in the support member, and a cover member connected to the support member so as to cover the pump and the first pump vibration-damping portion.

Meanwhile, the first and second pump vibration-damping members may be formed of rubber.

The pump and the main water purifying filter may be connected by a plurality of connection members having a bent shape, such that the transmission of vibrations to the main water purifying filter due to the pressure difference between the pump and the main water purifying filter is reduced, and one side of the connection member is provided with a nipple, and a nipple or a connection pipe is inserted and connected to the other side of the connection member, or a nipple or a connection pipe is inserted in one side and the other side of the connection member, respectively.

In addition, the main water purifying filter is a reverse osmosis filter.

Advantageous Effects

According to an example embodiment of the present invention, transmission of vibrations to a filter bracket and a water purifier body due to a pressure difference between a pump and a main water purifying filter can be reduced when water is supplied to the main water purifying filter by the pump.

MODE FOR INVENTION

Figure 1:
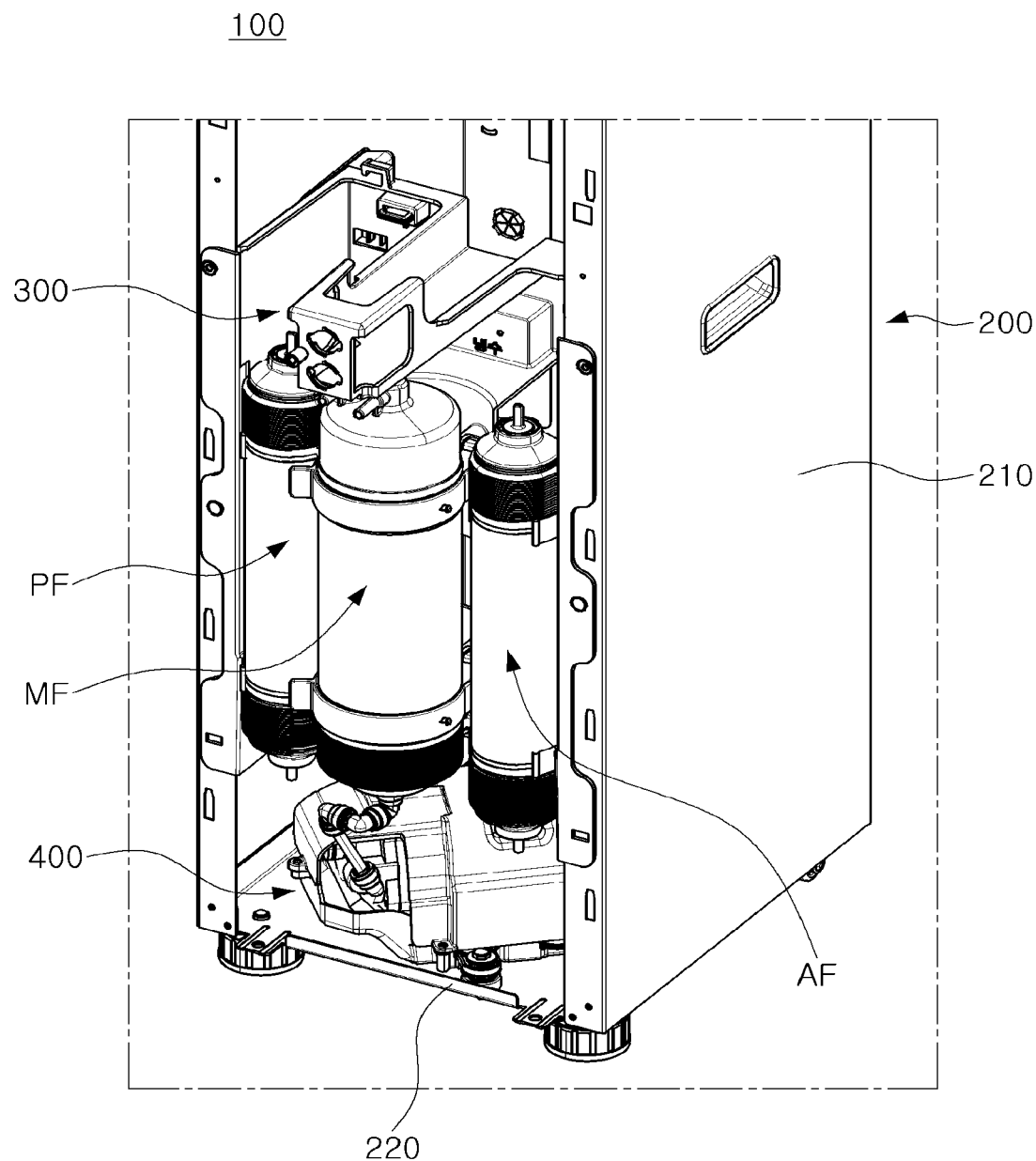
FIG. 1 is a partially enlarged perspective view of a water purifier according to an embodiment of the present invention.

In order to help understand the features of the present invention as described above, a water purifier related to an embodiment of the present invention will be described in more detail below.

Hereinafter, embodiments most appropriate to help in an understanding of the technical features of the present invention will be described, the technical features of the present invention are not limited by the described embodiments and merely illustrate the implementation of the present invention through the embodiments described hereinafter. Thus, the present invention can be variably modified within the scope of the present invention through the embodiments described below, and such modifications are within the scope of the present invention. In order to help understand the embodiments described hereinafter, the like or similar reference numerals are used for relevant components among the components having the same function in the respective embodiments in the accompanying drawings.

Hereinbelow, a water purifier according to an embodiment of the present invention will be described with reference to FIGS. 1 to 6.

Figure 2:
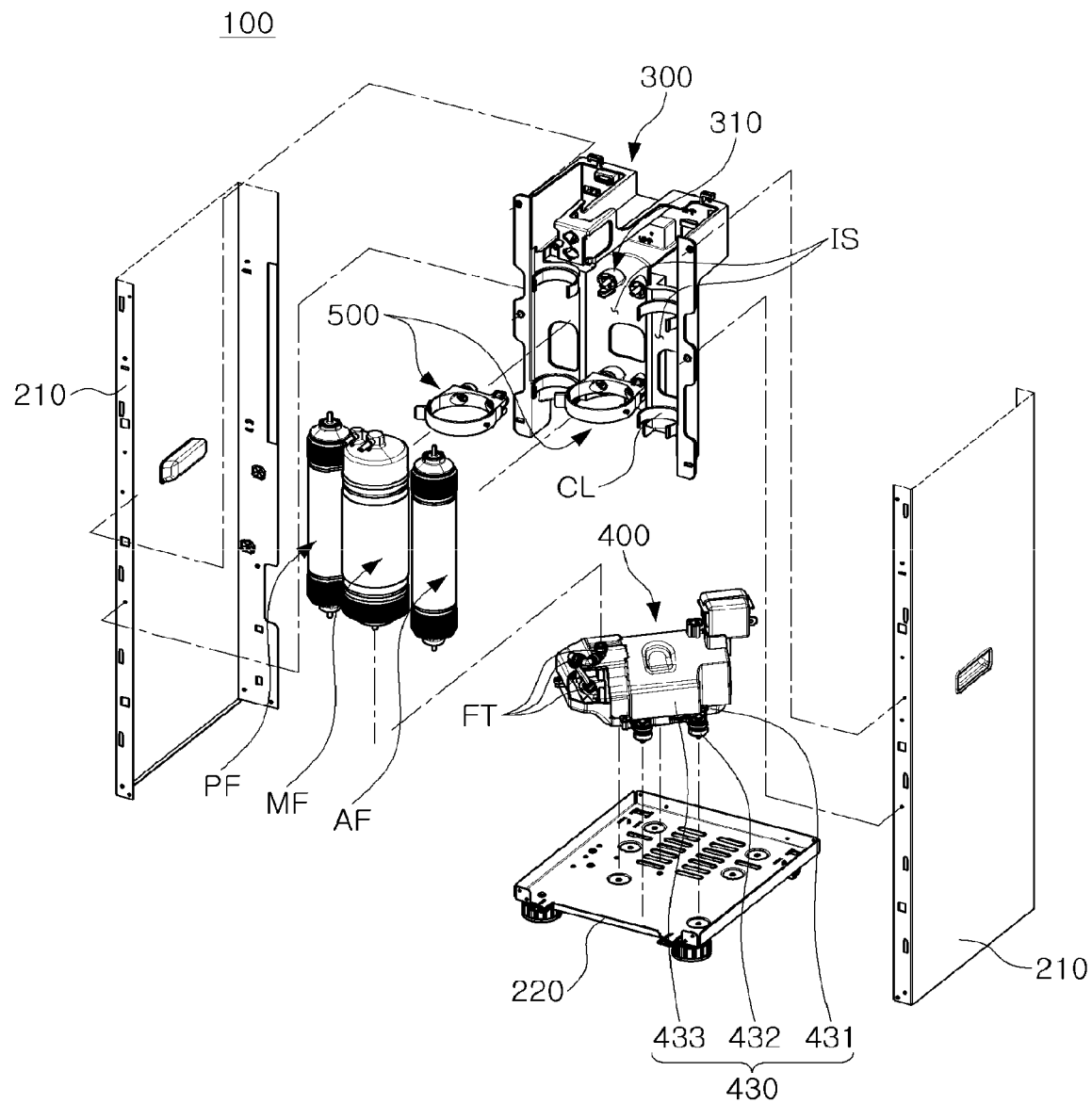
FIG. 2 is an exploded perspective view of a portion of the water purifier according to an embodiment of the present invention illustrated in FIG. 1.

FIG. 1 is a partially enlarged perspective view of a water purifier according to an embodiment of the present invention, and FIG. 2 is an exploded perspective view of a portion of the water purifier according to an embodiment of the present invention illustrated in FIG. 1.

Figure 3:
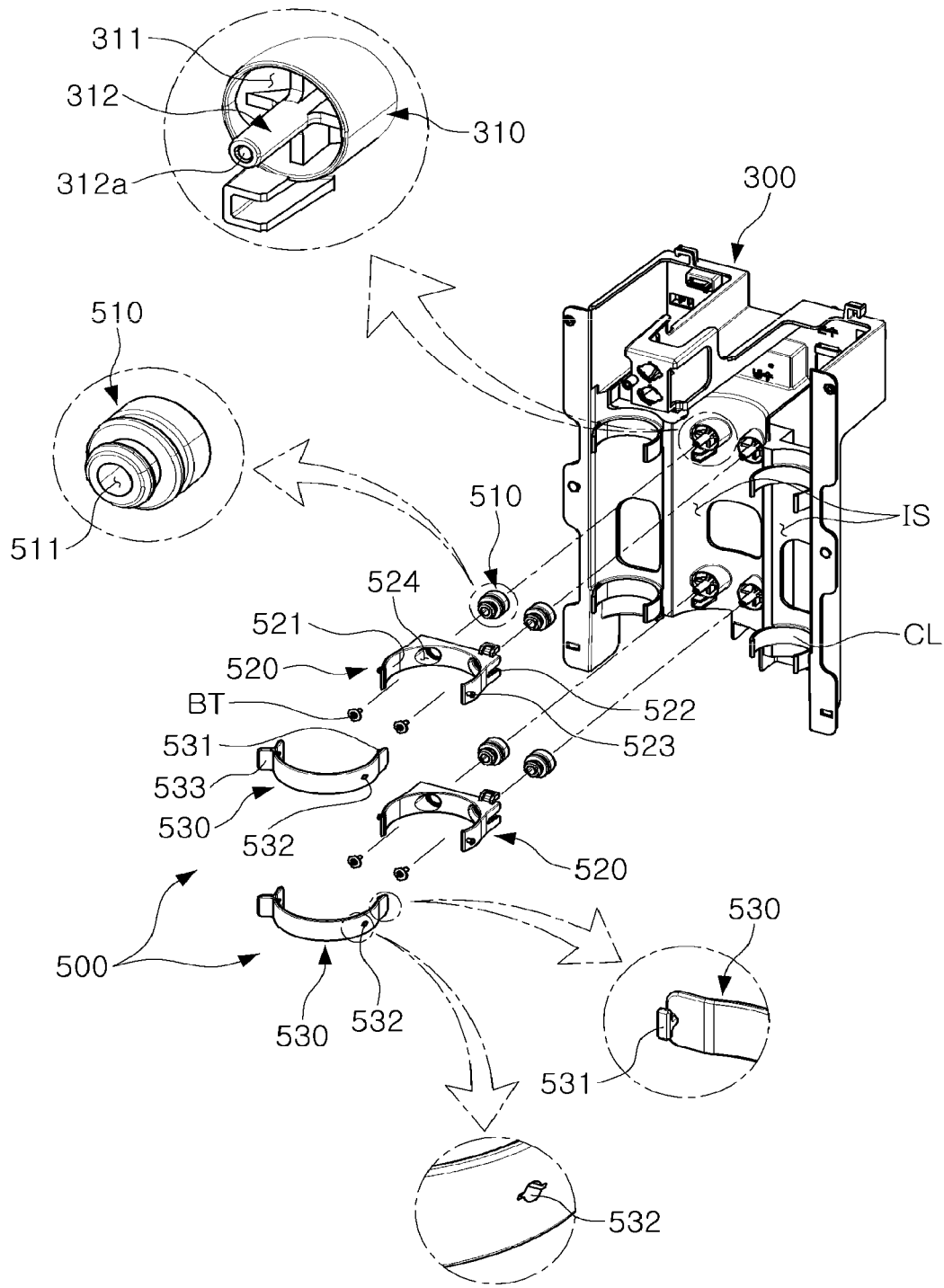
FIG. 3 is a perspective view of a filter bracket and a vibration transmission-preventing unit of a water purifier according to an embodiment of the present invention.
Figure 4:
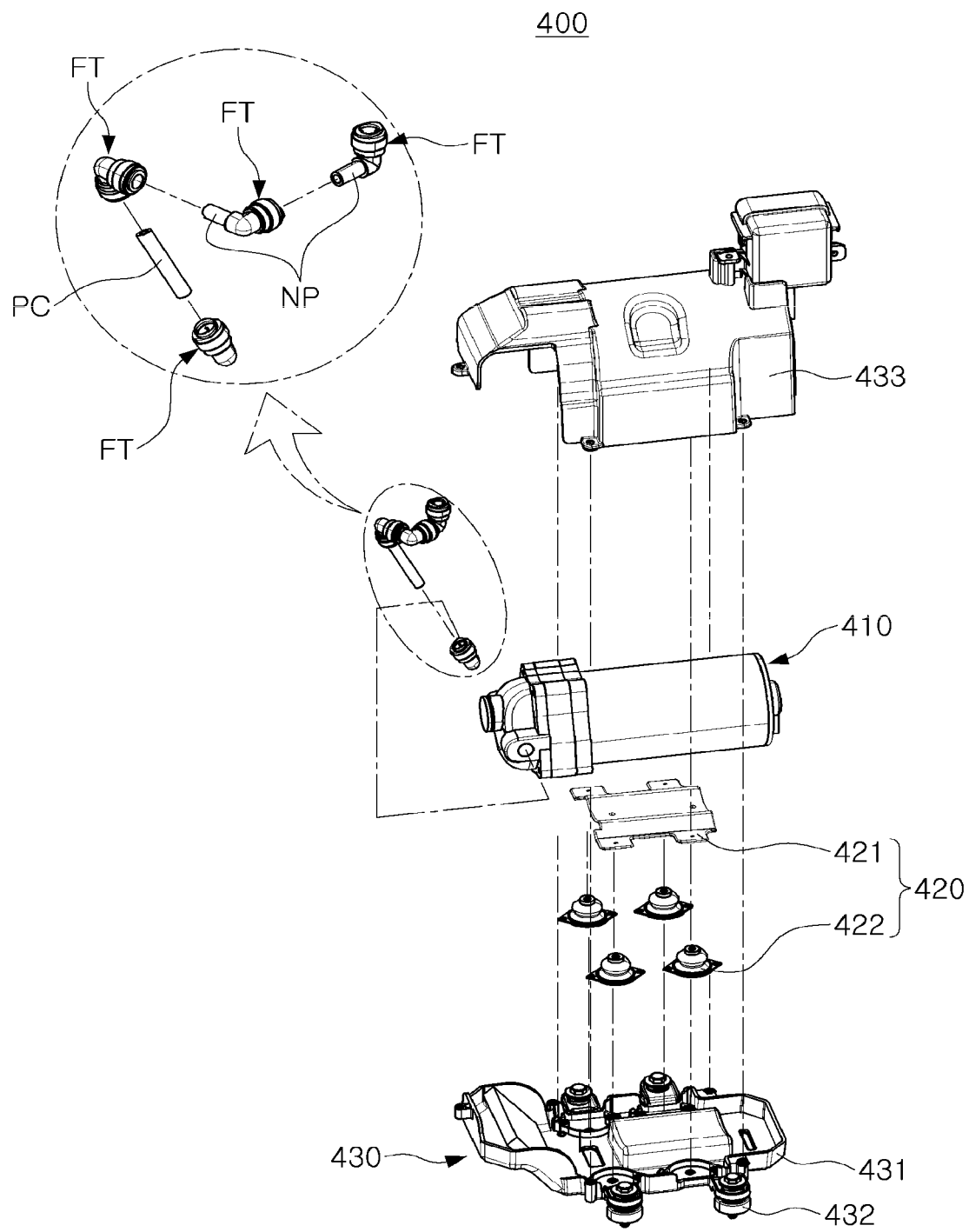
FIG. 4 is an exploded perspective view of a pump unit of a water purifier according to an embodiment of the present invention.

FIG. 3 is a perspective view of a filter bracket and a vibration transmission-preventing unit of a water purifier according to an embodiment of the present invention, while FIG. 4 is an exploded perspective view of a pump unit of a water purifier according to an embodiment of the present invention.

Figure 5:
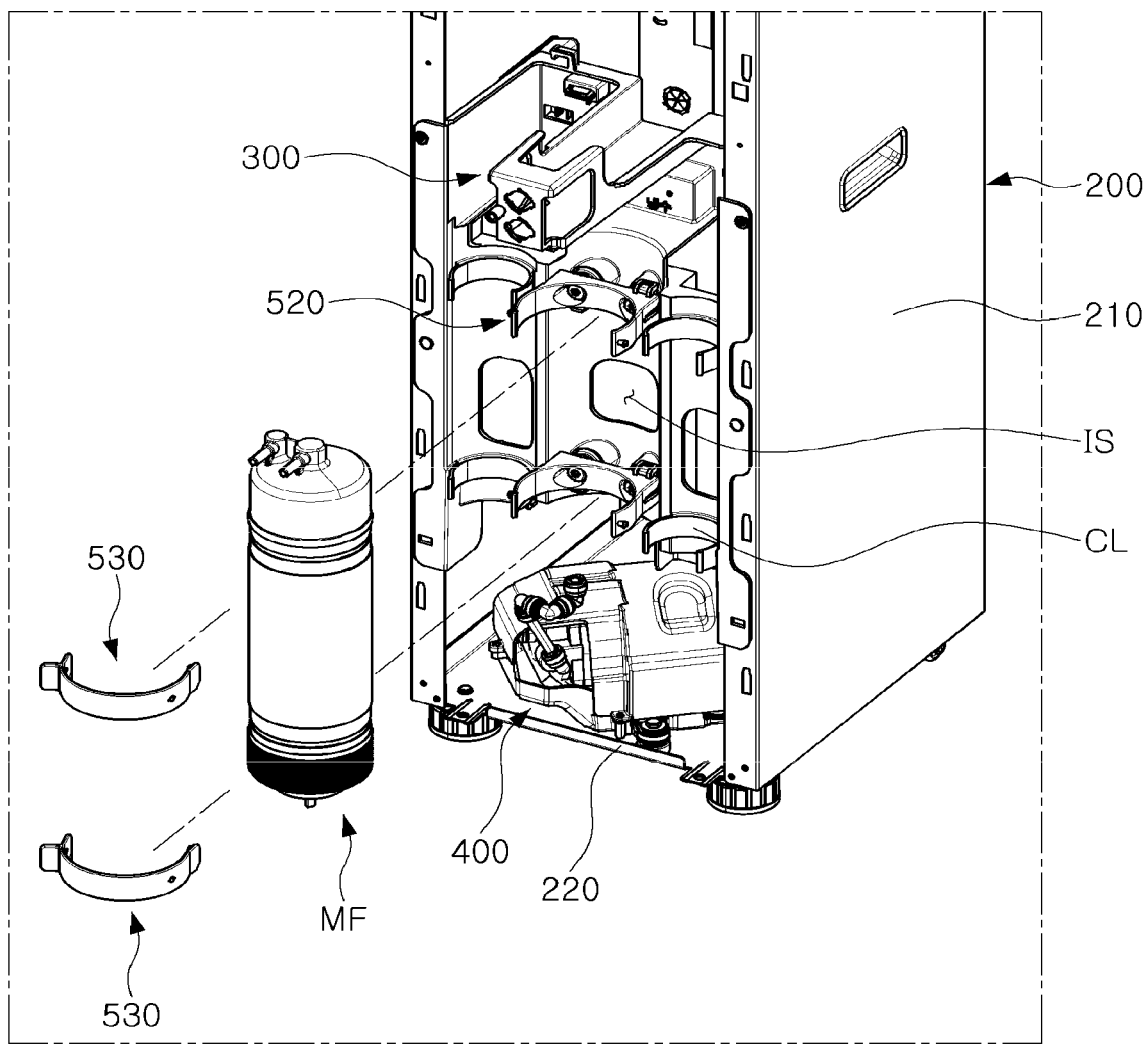
FIGS. 5 and 6 are diagrams illustrating installation of a main water purifying filter in a filter bracket of a water purifier according to an embodiment of the present invention by a vibration transmission-preventing unit.
Figure 6:
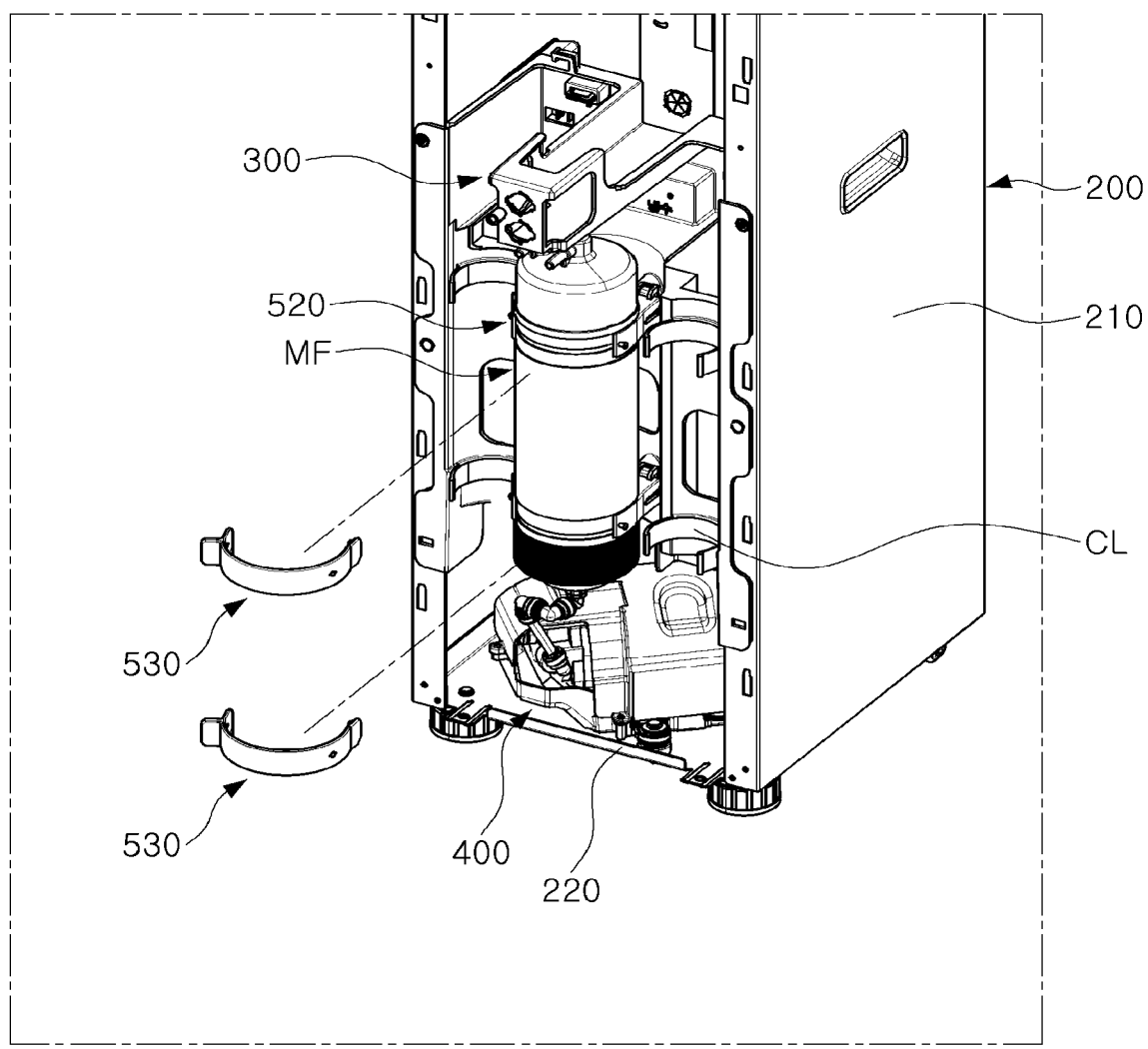

FIGS. 5 and 6 are diagrams illustrating installation of a main water purifying filter in a filter bracket of a water purifier according to an embodiment of the present invention by a vibration transmission-preventing unit.

A water purifier 100 according to an embodiment of the present invention may include a water purifier body 200, a filter bracket 300, a pump unit 400 and a vibration transmission-preventing unit 500.

As illustrated in FIGS. 1 and 2, the water purifier body 200 may include a plurality of side surface members 210 connected to each other, and a lower surface member 220 covering an open bottom of the plurality of side surface members 210 connected to each other. In addition, the water purifier body 200 may include an upper surface member (not illustrated) covering an open top of the plurality of side surface members 210 connected to each other. As a result, a space in which the filter bracket 300 and the pump unit 400 are provided may be formed in the water purifier body 200 as illustrated in FIGS. 1, 5 and 6. In addition to the filter bracket 300 and the pump unit 400 described above, other components (not illustrated) of the water purifier may be provided in the space inside the water purifier body 200.

A configuration of the water purifier body 200 is not particularly limited, and any known configuration may be employed as long as there is a space for water purifier components, such as the filter bracket 300, the pump unit 400, or the like, therein.

The filter bracket 300 may be provided inside the water purifier body 200. The filter bracket 300 may be connected to the side surface member 210 of the water purifier body 200 by a bolt, or the like, to be provided inside the water purifier body 200 as illustrated in FIG. 1. However, the configuration in which the filter bracket 300 is provided inside the water purifying body 200 is not particularly limited, and any known configuration may be employed.

A main water purifying filter MF may be installed in the filter bracket 300. The main water purifying filter MF installed in the filter bracket 300 may be, for example, a reverse osmosis filter. However, the main water purifying filter MF is not particularly limited, and any known water purifying filter may be used.

As illustrated in FIGS. 5 and 6, the main water purifying filter MF may be installed in the filter bracket 300 by a vibration transmission-preventing unit 500 to be described later. This may serve to reduce transmission of vibrations to the filter bracket 300 and the water purifier body 200 through the main water purifying filter MF due to a pressure difference between a pump 410 included in the pump unit 400 and the main water purifying filter MF, when water is supplied to the main water purifying filter MF by the pump 410.

The filter bracket 300, as illustrated in FIGS. 2 and 3, may be provided with a filter installation space IS in which water purifying filters MF, PF and AF, such as a main water purifying filter MF, are installed. For example, three filter installation spaces IS may be formed in the filter bracket 300. The three water purifying filters MF, PF and AF, including the main water purifying filter MF, a pre-treatment filter PF connected to the main water purifying filter MF to be positioned before the main water purifying filter MF in a direction of water flow, and a post-treatment filter AF connected to the main water purifying filter MF to be positioned after the main water purifying filter MF in the direction of water flow, can be installed in the three filter installation spaces IS formed in the filter bracket 300. However, a number of the filter installation spaces IS formed in the filter bracket 300 is not particularly limited, and any number thereof can be employed as long as the water filters MF, PF and AF including the main water purifying filter MF can be installed.

The filter installation space IS may have a partial cylindrical shape so that portions of the cylindrical water purifying filter MF, PF and AF are inserted and installed as illustrated in FIGS. 2 and 3. However, a shape of the filter installation space IS is not particularly limited, and any shape is feasible as long as it is a shape in which water purifying filters MF, PF and AF can be installed.

An arc-shaped filter installation clip CL may be provided in the filter installation space IS other than the filter installation space IS in which the main water purifying filter MF is installed. For example, as illustrated in FIGS. 2 and 3, two of the filter installation clips CL may be provided in the upper and the lower portion of the filter installation space IS. In addition, the pre-treatment filter PF or the post-treatment filter AF may be installed in the filter installation space IS by being inserted and fitted into the filter installation clip CL so as not to deviate from the filter installation space IS. However, the configuration in which the water filters MF, PF and AF other than the main water purifying filter MF are installed so as not to deviate from the filter installation space IS is not particularly limited, and any known configuration can be employed.

A vibration-damping member-supporting portion 310 may be formed in the filter installation space IS in which the main water purifying filter MF is installed. For example, as illustrated in FIGS. 2 and 3, two vibration-damping member-supporting portions 310 are formed in the upper portion of the filter installation space IS in which the main water purifying filter MF is installed, and the two vibration-damping member-supporting portions 310 may be formed in the lower portion of the filter installation space IS in which the main water purifying filter MF is installed. However, a position and a number of the vibration-damping member-supporting portions 310 formed in the filter installation space IS in which the main water purifying filter MF is installed are not particularly limited, and any position or number may be feasible.

An insertion support hole 311 may be formed in the vibration-damping member-supporting portion 310. The insertion support hole 311 may be provided with one end of a filter vibration-damping member 510, to be described later, included in the vibration transmission-preventing unit 500 inserted thereinto. A through-connection protrusion 312 may further be formed in the vibration-damping member-supporting portion 310. The through-connection protrusion 312 may be formed to be provided in the insertion support hole 311. A coupling hole 312a may be formed in the through-connection protrusion 312. The through-connection protrusion 312 may pass through a through-hole 511, to be described later, formed in the filter vibration-damping member 510 having one end inserted into and supported by the insertion support hole 311. Additionally, as described below, a coupling member BT, such as a bolt, or the like, is coupled to the coupling hole 312a, so that the clip member 520, to be described later, included in the vibration transmission-preventing unit 500 is connected to the filter bracket 300.

The pump unit 400 may be provided inside the water purifier body 200. For example, the pump unit 400 may be provided inside the water purifier body 200 below the filter bracket 300 as illustrated in FIGS. 1 and 2. However, the position of the pump unit 400 inside the water purifier body 200 is not particularly limited, and any position is feasible.

The pump unit 400 may include a pump 410 connected to the main water purifying filter MF. Water may be supplied to the main water purifying filter MF at a predetermined filtration pressure by the pump 410. The pump 410 is not particularly limited, and any known pump may be used as long as it can supply water to the main water purifying filter MF at a predetermined filtration pressure. The pump 410 may be connected to the pretreatment filter PF positioned before the main water purifying filter MF in the direction of water flow by, for example, a connection pipe PC. Accordingly, the water filtered by the pretreatment filter PF may be pressurized at a predetermined filtration pressure by the pump 410 and supplied to the main water purifying filter MF.

The pump 410 and the main water purifying filter MF may be connected by a plurality of connection members FT, as illustrated in FIGS. 2 and 4. The connection member FT is provided with a nipple NP on one side, and a nipple NP or a connection pipe PC is inserted and connected to the other side of the connection member FT. Alternately, a nipple NP or a connection pipe PC may be inserted into to one side and the other side of the connection member FT, respectively. In addition, the connection member FT may have a bent shape. As a result, the plurality of connection members FT may have a degree of freedom to move by an external force. In addition, when water is supplied to the main water purifying filter MF by the pump 410, the transmission of the vibration to the main water purifying filter MF due to the pressure difference between the pump 410 and the main water purifying filter MF can be attenuated.

The pump unit 400 may be configured to attenuate vibration noises of the pump 410 by pump vibration-damping members 422 and 432.

To this end, the pump unit 400 may further include a first pump vibration-damping portion 420. The first pump vibration-damping portion 420 may include a pump supporting board 421 and a first pump vibration-damping member 422. The pump supporting board 421 may support the pump 410. In addition, the first pump vibration-damping member 422 may be provided on the pump supporting board 421. The first pump vibration-damping member 422 may be formed of rubber. Accordingly, vibrations and noise of the pump 410 generated by the pump 410 and transmitted through the pump supporting board 421 may be attenuated by the first pump vibration-damping member 422. However, a material of the first pump vibration damping member 422 is not particularly limited, and any known material may be used as long as the vibrations and noise of the pump 410 can be attenuated.

The pump unit 400 may further include a second pump vibration-damping portion 430. The second pump vibration-damping portion 430 may include a support member 431, a second pump vibration-damping member 432, and a cover member 433. The support member 431 may support the first pump vibration-damping portion 420. The second pump vibration-damping member 432 may be provided in the support member 431. The second pump vibration-damping member 432 may be formed of rubber. Accordingly, the vibration and noise generated by the pump 410 which cannot be attenuated by the first pump vibration-damping portion 420 may be attenuated by the second pump vibration-damping member 432. However, the material of the second pump vibration-damping member 432 is not particularly limited, and any known material may be used as long as the vibration and noise generated by the pump 410 which cannot be attenuated by the first pump vibration-damping portion 420 can be attenuated. The cover member 433 may be connected to the support member 431 so as to cover the pump 410 and the first pump vibration-damping portion 420. The noise generated by the pump 410 can be prevented from being transmitted to an outside by the cover member 433.

The vibration transmission-preventing unit 500 may allow the main water purifying filter MF to be installed in the filter bracket 300. In addition, the vibration transmission-preventing unit 500 may be configured to attenuate transmission of the vibration to the filter bracket 300 and the water purifier body 200 due to the pressure difference between the pump 410 and the main water purifying filter MF, through the filter vibration-damping member 510, when supplying water to the main water purifying filter MF by the pump 410.

Accordingly, when water is supplied to the main water purifying filter MF by the pump 410, transmission of the vibrations to the water purifier body 200 and the filter bracket 300 through the main water purifying filter MF due to the pressure difference between the pump 410 and the main water purifying filter MF can be attenuated.

The vibration transmission-preventing unit 500 may include the above-described filter vibration-damping member 510, a clip member 520 and an elastic band member 530.

The filter vibration-damping member 510 may be provided in the filter bracket 300. One end of the filter vibration-damping member 510 may be inserted into the above mentioned insertion support hole 311 formed in the vibration-damping member-supporting portion 310 of the filter bracket 300. In addition, the other end of the filter vibration-damping member 510 may be inserted into a connection insertion hole 524, to be described later, formed in the clip member 520. A through-hole 511, through which the above described through-connection protrusion 312 formed in the vibration-damping member-supporting portion 310 of the filter bracket 300 passes may be formed in the filter vibration-damping member 510. The filter vibration-damping member 510 may be formed of rubber. Accordingly, when water is supplied to the main water purifying filter MF by the pump 410, the vibrations due to the pressure difference between the pump 410 and the main water purifying filter MF may be attenuated by the filter vibration-damping member 510 even when transmitted to the main water purifying filter MF, thereby attenuating the transmission of the vibrations to the filter bracket 300 and the water purifier body 200.

The clip member 520 may be connected to the filter bracket 300 through the filter vibration-damping member 510. In addition, a portion of a circumference of the main water purifying filter MF may be inserted and installed in the clip member 520.

A filter installation portion 521 may be formed in the clip member 520. A portion of the circumference of the main water purifying filter MF may be inserted and installed in the filter installation portion 521. The filter installation portion 521 may have an arc shape. However, a shape of the filter installation part 521 is not particularly limited, and any shape may be feasible as long as a shape that allows the portion of the circumference of the main water purifying filter MF to be inserted and installed in the filter installation part 521.

A band connection groove 522 may be formed in the clip member 520. A band connection protrusion 531, to be described later, formed in the elastic band member 530 may be inserted into the band connection groove 522 to be connected. In addition, a supplemental connection protrusion 523 may be formed in the clip member 520. The supplemental connection protrusion 523 may be connected by being inserted into a supplemental connection hole 532, described later, formed in the elastic band member 530.

A connection insertion hole 524 may be formed in the clip member 520. The other end of the filter vibration-damping member 510 may be inserted into the connection insertion hole 524. In this state, the clip member 520 may be connected to the filter bracket 300 by having the coupling member BT, such as a bolt, or the like, coupled to the coupling hole 312a of the through-connection protrusion 312 passing through the through-hole 511 of the filter vibration-damping member 510. Further, the clip member 520 may be supported by the filter vibration-damping member 510.

The elastic band member 530 may be connected to the clip member 520 to elastically surround the remaining circumference of the main water purifying filter MF. Accordingly, the main water purifying filter MF may not deviate from the filter installation portion 521 of the clip member 520 due to elastic force of the elastic band member 530. The elastic band member 530 may be formed of rubber. However, a material of the elastic band member 530 is not particularly limited, and any known material can be employed as long as a material that allows the elastic band member 530 to be connected to the clip member 520 and exert elastic force such that the main water purifying filter MF does not deviate from the filter installation portion 521.

The elastic band member 530 may have an arc shape correspondingly to the filter installation portion 521 of the clip member 520. As a result, the elastic band member 530 may surround the remaining circumference of the main water purifying filter MF installed by inserting a portion of the circumference thereof into the filter installation portion 521 of the clip member 520. However, a shape of the elastic band member 530 is not particularly limited, and any shape can be feasible as long as a shape that allows the elastic band member 530 to be connected to the clip member 520 and surround the remaining circumference of the main water purifying filter MF installed by inserting a portion of the circumference thereof into the filter installation portion 521 of the clip member 520.

The elastic band member 530 may have the band connection protrusion 531 inserted into and connected to the above mentioned band connection groove 522 of the clip member 520. In addition, the elastic band member 530 may have the supplemental connection hole 532 into which the supplemental connection protrusion 523 of the clip member 520 is inserted and connected. As a result, the elastic band member 530 may be connected to the clip member 520. However, the configuration in which the elastic band member 530 is connected to the clip member 520 is not particularly limited, and any known configuration may be employed. A handle 533 is formed in the elastic band member 530 such that connection and separation of the elastic band member 530 to and from the clip member 520 can be easily performed.

As described above, use of water purifier according to the present invention may serve to attenuate the transmission of the vibration to the filter bracket and the water purifier body due to the pressure difference between the pump and the main water purifying filter, when water is supplied to the main water purifying filter by the pump.

The configurations of the above-described embodiments are not limitedly applicable to the water purifier described above. All or part of the embodiments may be selectively combined so that various modifications can be made.

The invention claimed is:

1. A water purifier, comprising:
    a water purifier body;
    a filter bracket provided inside the water purifier body;
    a pump unit provided inside the water purifier body and comprising a pump connected to a main water purifying filter installed in the filter bracket; and
    a vibration transmission-preventing unit which, when the main water purifying filter is installed in the filter bracket, ensures that the transmission, to the filter bracket and the water purifier body, of vibrations due to the pressure difference between the pump and the main water purifying filter when water is supplied to the main water purifying filter by means of the pump, is reduced by a filter vibration-damping member, wherein the vibration transmission-preventing unit comprises the filter vibration-damping member provided in the filter bracket, a clip member connected to the filter bracket through the filter vibration-damping member and in which a portion of a circumference of the main water purifying filter is inserted and installed, and an elastic band member connected to the clip member to elastically surround a remaining portion of the circumference of the main water purifying filter, the filter vibration-damping member and the elastic band member are formed of rubber, the pump unit further comprises a first pump vibration-damping portion comprising a pump supporting board configured to support the pump and a first pump vibration-damping member provided on the pump supporting board, and a second pump vibration-damping portion comprising a support member configured to support the first pump vibration-damping portion, a second pump vibration-damping member provided in the support member and a cover member connected to the support member so as to cover the pump and the first pump vibration-damping portion, and the first pump vibration-damping member and the second pump vibration-damping, member are formed of rubber.

2. The water purifier of claim 1, wherein the clip member is provided with an arc-shaped filter installation portion in which the portion of the circumference of the main water purifying filter is inserted and installed.

3. The water purifier of claim 2, wherein the elastic band member has an arc shape corresponding to the filter installation portion.

4. The water purifier of claim 1, wherein
the clip member is formed with a band connection groove, and
a band connection protrusion inserted into and connected to the band connection groove is formed in the elastic band member.

5. The water purifier of claim 4, wherein
the clip member is formed with a supplemental connection protrusion, and
a supplemental connection hole into which the supplemental connection protrusion is inserted and connected is formed in the elastic band member.

6. The water purifier of claim 1, wherein
the filter bracket is formed with a vibration-damping member-supporting portion having an insertion support hole in which one end of the filter vibration-damping member is inserted, and
the clip member is formed with a connection insertion hole into which the other end of the filter vibration-damping member is inserted.

7. The water purifier of claim 6, wherein
the vibration-damping member-supporting portion is further formed with a through-connection protrusion to be provided in the insertion support hole, and
the filter vibration-damping member is formed with a through-hole through which the through-connection protrusion passes.

8. The water purifier of claim 7, wherein
the through-connection protrusion is formed with a coupling hole, and
a coupling member is coupled to the coupling hole such that the clip member is connected to the filter bracket.

9. The water purifier of claim 1, wherein
the pump and the main water purifying filter are connected by a plurality of connection members having a bent shape, such that the transmission of vibrations to the main water purifying filter due to the pressure difference between the pump and the main water purifying filter is reduced, and
the water purifier comprises at least one of
a first connection member having one side provided with a first nipple, and one of a second nipple and a first connection pipe is inserted and connected to the other side of the first connection member, and
a second connection member having one side and another side, wherein one of a third nipple and a second connection pipe is inserted in the one side or the other side of the second connection member.

10. The water purifier of claim 1, wherein the main water purifying filter is a reverse osmosis filter.

* * * * *